United States Patent [19]
Hill et al.

[11] 3,822,647
[45] July 9, 1974

[54] PASSIVE SWITCHING SYSTEM

[75] Inventors: Charles C. Hill; James A. Ross, both of La Jolla, Calif.

[73] Assignee: Rohr Industries, Inc., Chula Vista, Calif.

[22] Filed: July 9, 1973

[21] Appl. No.: 377,608

[52] U.S. Cl............ 104/130, 104/148 MS, 318/687
[51] Int. Cl. .......................................... H02k 41/04
[58] Field of Search............104/130, 148, 148 LM, 148 MS; 310/12, 13, 14; 318/687

[56] References Cited
UNITED STATES PATENTS

| | | | |
|---|---|---|---|
| 1,020,942 | 3/1912 | Bachelet | 310/14 |
| 2,870,349 | 1/1959 | Rosenberg | 310/13 |
| 3,125,964 | 3/1964 | Silverman | 104/89 |
| 3,638,093 | 1/1972 | Ross | 104/148 MS |
| 3,669,026 | 6/1972 | Mouritzen | 104/138 |

*Primary Examiner*—M. Henson Wood, Jr.
*Assistant Examiner*—Richard A. Bertsch

[57] ABSTRACT

Apparatus for the switching of a magnetically suspended vehicle from a primary guideway through a curved intersection to a secondary guideway. The vehicle is equiped with a pair of electromagnetic motors which provide a magnetic force to suspend the vehicle from a pair of support rails positioned above and in a superimposed relationship with the electro-magnetic motors. The rails at the intersection of the guideways have increased width so as to maintain an essentially superimposed relationship with their respective electromagnetic motor throughout the curve of the intersection and one rail of each guideway has at least one opening to allow the vehicle structure to pass through and the remaining rail of each guideway forms a unitary rail member. The vehicle is switched by a relative speed difference between the motors caused by input power frequency differences.

11 Claims, 7 Drawing Figures

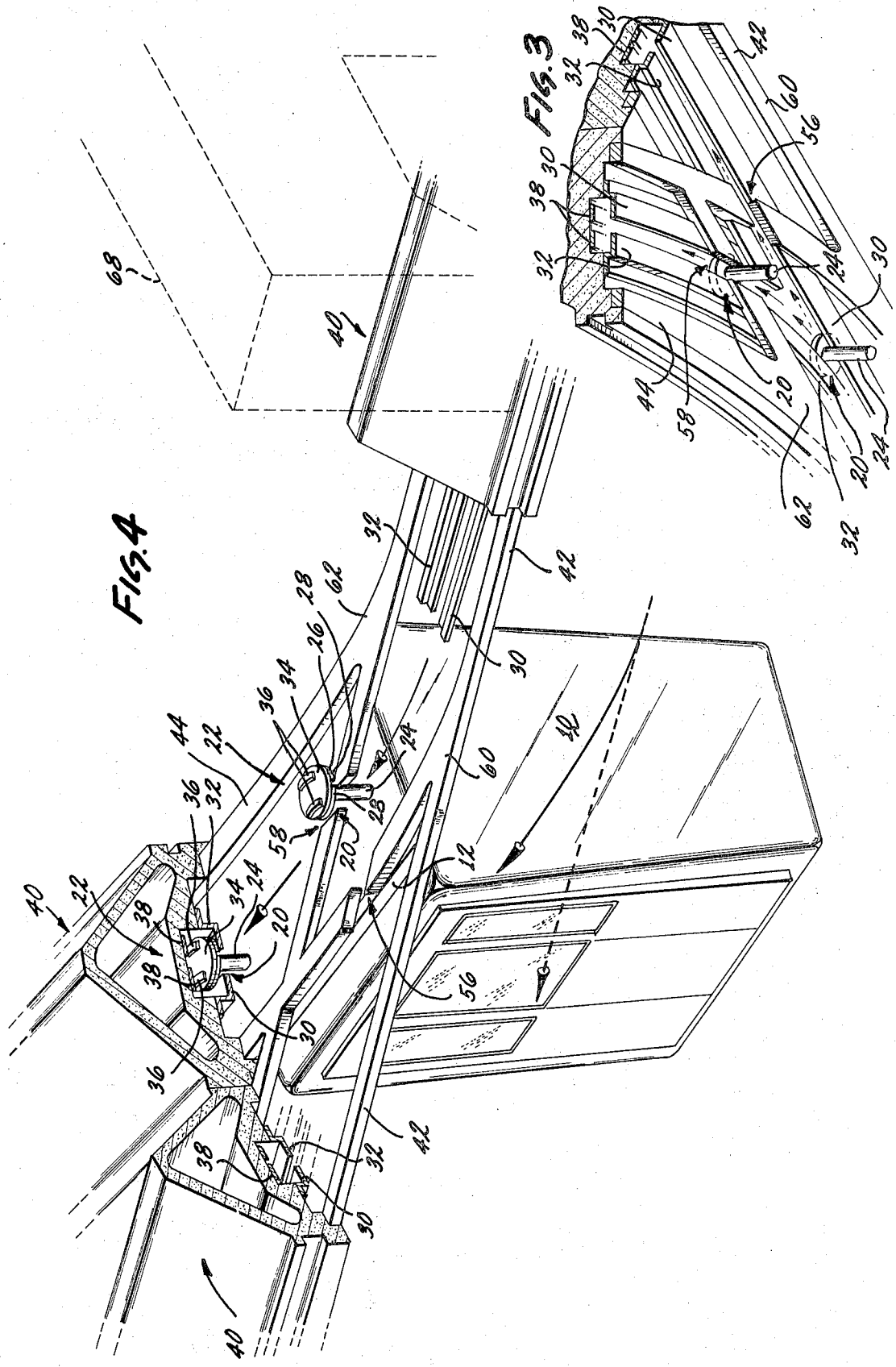

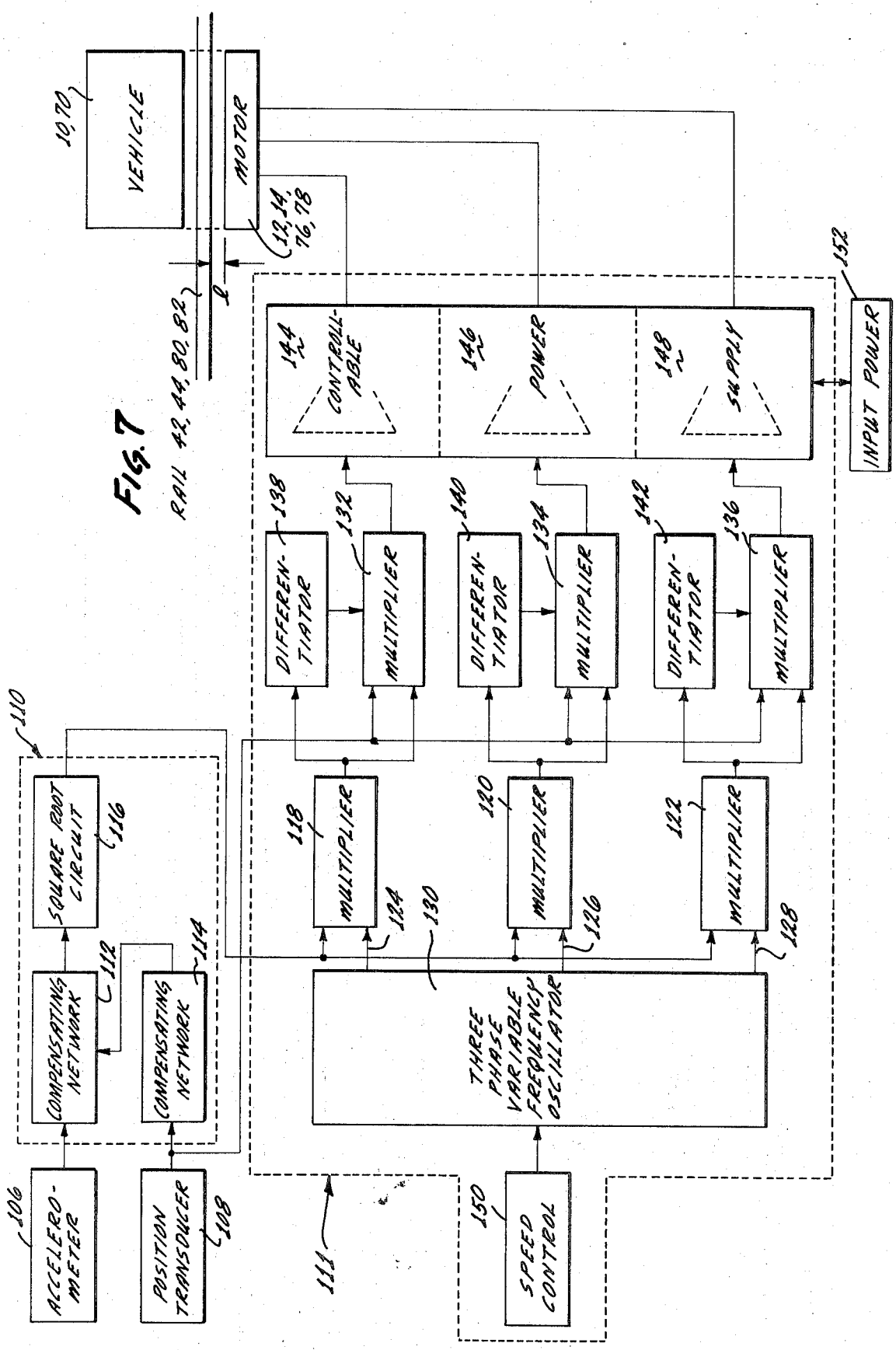

PASSIVE SWITCHING SYSTEM

BACKGROUND OF THE INVENTION

The present invention relates to captive vehicle switching and more specifically to switching magnetically suspended vehicles.

In the field of magnetically suspended vehicles where there is no physical contact between the vehicle and its supporting surface, new concepts for switching from one guideway to another while the vehicles move toward their destinations, need to be developed. An illustrative transportation system is taught by U.S. Pat. No 3,638,093 and 3,736,880, both by James A. Ross. These patents teach a vehicle transport system that uses the same linear electric motor flux for suspension and propulsion of a high speed tracked vehicle. The vehicle operates below a support rail without physical contact therewith. Displacement and inertial acceleration sensors carried by the vehicle sense the gap length of the motor to rail and any vertical acceleration of the vehicle. A non-linear feedback circuit responds to the sensor signals and controls the voltage applied to the phased windings of the motor to maintain the selected gap. The frequency of the voltage applied to the phased windings of the motor is varied upwards from zero to adjut the linear speed of the motor, and the voltage is increased with the frequency to compensate for the increase in inductive reactance of the windings. This control system allows a wide dynamic range of motor control to cover the propulsion range from standstill to high speed without requiring a wide dynamic range in the feedback control elements. This concept is so unique and new that many new problems have occurred in the switching systems of this type vehicle. The solutions to these problems had not been satisfactorily resolved until the emergence of the instant invention.

German Pat. No. 707,032 by H. Kemper teaches improvements for switching of suspended vehicles which consists of separate electro-magnets in addition to those magnets used for suspension and propulsion. These additional electro-magnets are controlled through separate automatic control units and are attached to the sides of the vehicle for reaction with mechanically fixed switches with guide rails placed at switch points along the guideway. By energizing these electro-magnets the direction of the vehicle can be selected.

Other embodiments utilize a system for switching a high speed captive surface vehicle from a primary guideway to a secondary guideway by magnetic attraction. The vehicle carries on its sides separate controllable electro- magnetic force fields that cause the vehicle to be magnetically attracted toward, but without touching, corresponding guidance rails placed along the guideways. Switching is accomplished by selecting and controlling the force of the electro-magnets.

The above described teachings require that additional electromagnets and guide rails be utilized for the singular purpose of switching the vehicle. Obviously, this requires additional and complex controls for varying the force fields required for switching these additional systems adding complexity and weight to the vehicle and increased guideway construction costs.

SUMMARY OF THE INVENTION

The switching concept of this invention utilizes the existing magnetic motors and rails of the aforementioned James A. Ross patents.

The existing system comprises a pair of ferromagnetic rails superimposed over the vehicle electromagnetic motors that may extend substantially the entire longitudinal length of the vehicle, an oscillator for varying the frequency to the motors for selected forward vehicle speeds, a feedback control system for maintaining the distance between the rail and motors substantially constant regardless of load or forward speed and controllable voltage power supplies for supplying controlled force field power. To incorporate the present invention into this suspension-propulsion system, the only additional circuit requirement is an additional oscillator, i.e., one for controlling each separate motor speed. When straight travel is desired both oscillators have the same output frequency. When switching is desired, each oscillator has a different frequency output allowing one motor to have greater forward speed than the other. This speed difference causes the vehicle to turn about through the vertical axis of the mass center of the vehicle. The frequency difference is determined by the radius of the switching intersection arc and the forward speed of the vehicle. The frequencies may be varied manually or automatically by convenient electronic means taking into consideration both vehicle forward speed and intersection arc. The rails at the intersection are provided with additional width and openings for vehicle support structure to pass through.

The invention eliminates the need for additional magnets and associated reaction rails, additional complex electronic control systems, increased vehicle weight reducing pay loads, and additional expenses associated therewith.

The foregoing and various other features of the invention will appear in the course of the description which is rendered below with reference to the accompanying drawings.

BRIEF DESCRIPTION OF THE DRAWINGS

FIG. 3 is a perspective view of the under side of the switch interchange of FIG. 2.

FIG. 4 is a perspective view of the switch intersection of FIG. 2 with a partial cutaway of the support guideway.

FIG. 7 is a schematic diagram of the feedback and control circuit used to control all vehicle operations.

DESCRIPTION OF THE PREFERRED EMBODIMENT

Figure 6:
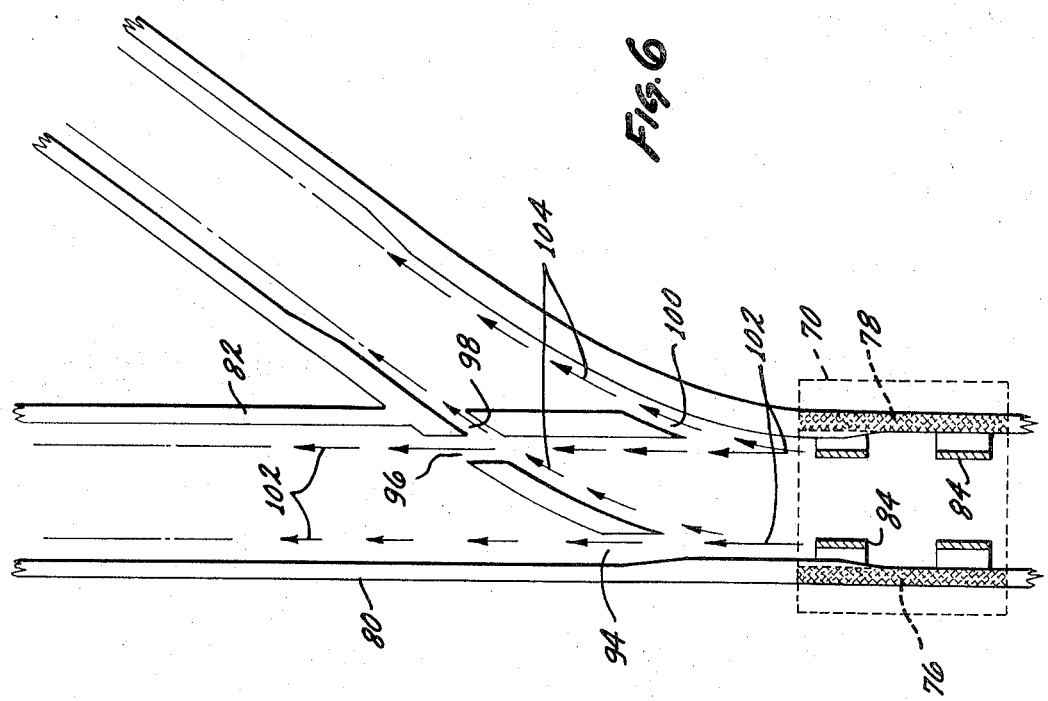
FIG. 6 is a plan view of the guideway interchange for the vehicle of FIG. 5.
Figure 5:
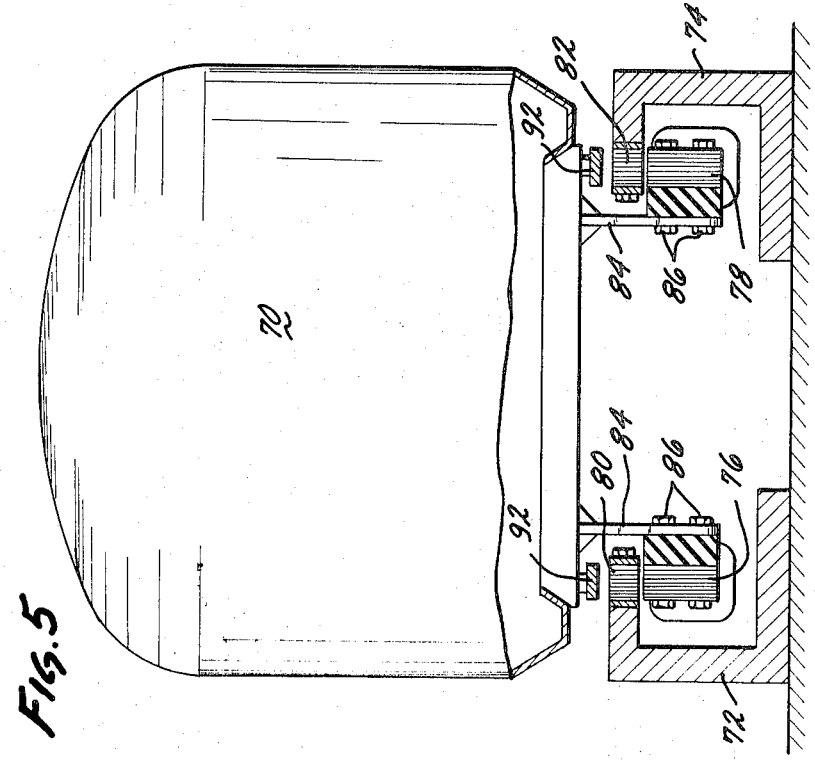
FIG. 5 is a front sectional view of a surface supported vehicle with the surface support guideway shown in cross-section.

The embodiment of the invention is shown taking two forms, namely, an overhead suspended type, as shown in FIGS. 1, 2, 3 and 4 and a surface supported vehicle as shown by FIGS. 5 and 6.

Figure 1:
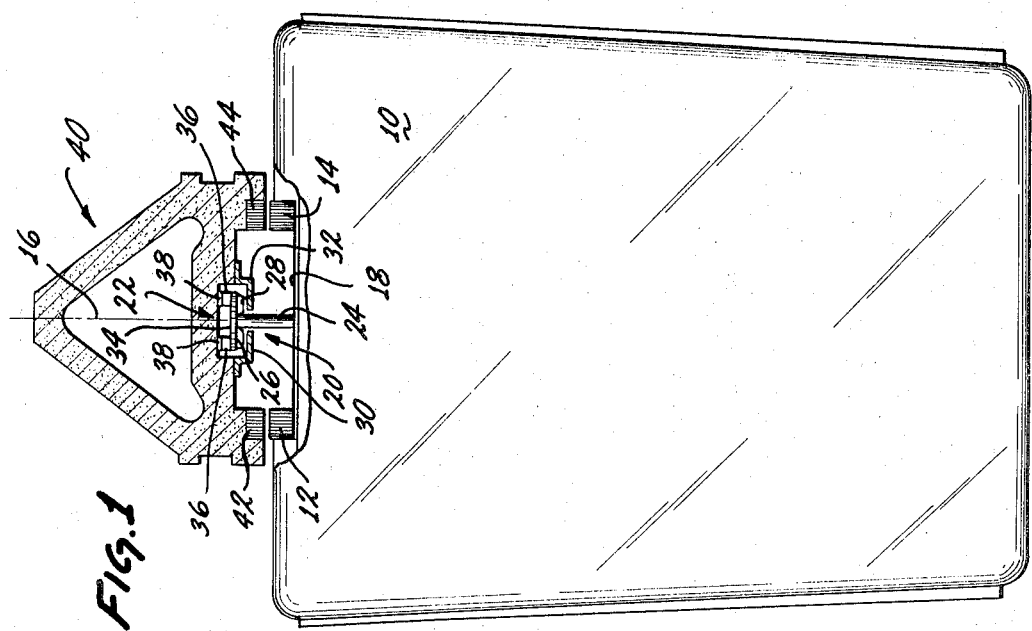
FIG. 1 is a front sectional view of an overhead suspended vehicle with the support guideway shown in cross-section.

Referring now specifically to FIG. 1, the vehicle 10 includes a pair of electro-magnetic force field motors 12 and 14 positioned longitudinally on each side of the vehicle's vertical center line 16 on its top surface 18. Positioned between and extending above the motors is at least one and preferably two safety support and power transfer members 20. The support member 20 has generally a "T" cross-sectional configuration with an upper cross member 22 shown as substantially disk shaped, however, the shape is of course not limited to any particular configuration. The support member 20 is supported by an upright member 24 secured by convenient means to the upper frame members of the vehicle (not shown). The bottom surface 26 of support member 20 may be provided with a layer 28 of conventional brake lining material or any other convenient surfacing that will allow the vehicle to slide to a stop and rest on support bracket surfaces 30 and 32, if the vehicle power should be removed for any reason. The upper side 34 of support member 20 is shown provided with a pair of sliding spring type power collecting shoe elements 36 rubbing on power input rails 38, however, a single shoe and rail combination may also be used. The power input picked up by shoes 36 is fed by any convenient conduction means such as bus bar at the trailing or leading surface of upright member 24 to the vehicle voltage conversion and control circuits (not shown) and from there routed by conventional means to various locations on the vehicle. The embodiment of the vehicle shown is designed for high voltage dc power pickup. It should be understood that the operation of the invention is not limited to dc voltage as any available commercial power could be used with only slight modifications to the vehicle borne conversion circuits.

The vehicle 10 is supported by overhead support means 40 which is continuous along the guideways and interchange and includes a pair of ferro-magnetic rails 42 and 44. These rails may be solid or laminated any may be made from various materials suitable for reacting with motors 12 and 14 respectively to provide suspension guidance and linear vehicle motion. The rails 42 and 44 are positioned along the guideways so as to be substantially superimposed and spaced at a selective distance from their respective motors as the vehicle either stands still or moves therealong. The rails must be superimposed over their respective motor so as to span substantially the entire upper surface area of the motor at any location of the vehicle either on the primary or secondary guideway 46 and 48 respectively, or the arcuate section 50 that provides the transition between the two guideways. Two hangers 30 and 32 running the entire length of the guideways are provided to support the brake material 28 carried by support member 20 when the system is not energized. The upper portion 34 of cross member 22 of safety support member 20 may be translatable so as to provide contact between the pickup shoes 36 and the hot rails 38 when the vehicle 10 is at rest or shoes of sufficient size and spring tension may be used that provide contact between the shoes and hot rails at all times whether at rest or during power operation.

It is preferable to mount motors 12 and 14 on a separate and elevated plane from ferro-magnetic members 42 and 44, as shown in FIG. 1, so that openings 56 and 58 in the ferro-magnetic members need be only wide enough to allow upright member 24 to pass through. A narroW opening is preferable to prevent vehicle pertabations when either motor 12 or 14 pass across openings 56 and 58.

Figure 2:
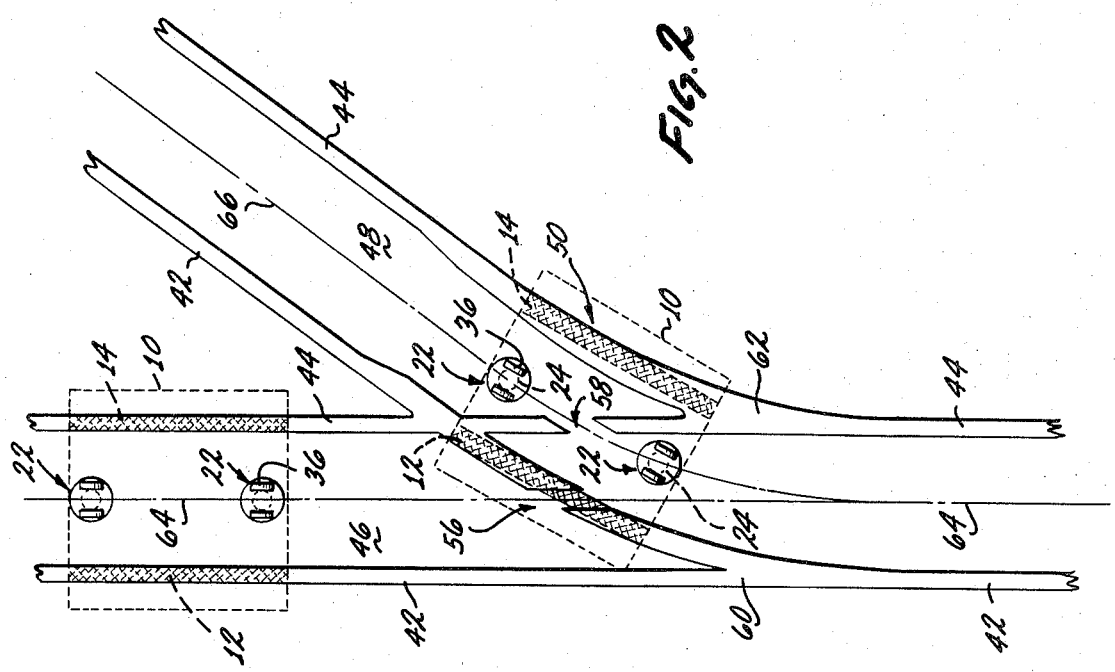
FIG. 2 is a plan view if the guideway interchange for the vehicle of FIG. 1.

Referring now specifically to FIG. 2, there is shown the arcuate section 50 that provides the vehicle interchange between the two guideways 46 and 48. The intersection is shown having generally a "Y" configuration with openings 56 and 58 in one rail of each guideway pair. The openings 56 and 58 are positioned substantially half way between the rail intersections of the two guideways. These openings permit the passage of the support member 24 through the crossing rail when the vehicle passes through the switch intersection. It should be understood that the positions of these openings 56 and 58 could be at any point between the guideway rail intersection depending upon the support member configuration employed and its placement. The other rail of each of the guideways form unitary rail sections 60 and 62. The rails are shown with increased width at the guideways rail intersections so as to allow the vehicle to negotiate through the arcuate portion 50 when switching from one guideway to the other is accomplished. The principle of operation of the vehicle suspension, propulsion and guideway system, as hereinafter discussed in specific detail, requires that the rails have a superimposed relationship with substantially the entire upper surface area of their respective motors during all routes of travel. The motors 12 and 14 are shown positioned below the rails of increased width in the arcuate portion of the interchange. The support member 20 and support member 24 are shown with respect to the center line 64 of the primary guideway and center line 66 and of the arcuate center change.

Referring now specifically to FIG. 3, this is a perspective view of the under side of the switch interchange showing vehicle 10 passing along the arcuate section as upright members 24 pass through opening 56 in the ferro-magnetic member 62. As hereinbefore discussed, preferably only the upright member 24 need pass through either rail opening 58, as shown, or 56 when the vehicle 18 passes through a switching intersection.

Referring now specifically to FIG. 4, this is a partially cutaway perspective view showing vehicle 10 passing along the arcuate interchange with one support member 24 passing through opening 58 of the primary guideway. A support column 68 phantomly shown by dotted lines, provides the support for member 40. These girders are typically placed along the entire route and are spaced at convenient distances apart as required to support the vehicle and payload along the span, not shown, between the successive support members.

Referring now specifically to FIG. 5, the surface supported embodiment, vehicle 70 is shown positioned above the surface rail support members 72 and 74 with motors 76 and 78 positioned below support rails 80 and 82 respectively. The motors are held in position and support the vehicle by their attachment to the vehicle motor support members 84 which are secured to the motors by convenient attachment means 86. The rails are similarly held to their support members 72 and 74 secured to their respective rails by convenient attachment means. The vehicle has associated with each of its corners a support pad 92 that may include brake lining material 78 or any suitable surfacing material, as support member 20 of FIGS. 1, 2, and 3, as hereinbefore discussed, to allow the vehicle to slide to a stop while the support pads rest on the rail when all power is removed. Power pickup means for the surface support system is not shown but could be a third rail or any convenient pantograph power pickup means.

FIG. 5 is a plan view of the primary and secondary guideway and arcuate section of the surface supported vehicle system. Openings 94 and 96 in the arcuate section rail and openings 98 and 100 in the primary guide rail, allow the vehicle motor support structure 84 to pass through the appropriate rail openings depending upon its direction of travel. Arrow 102 shows a straight-away direction of travel and arrow 104 shows the arcuate transition from straightaway travel to a secondary direction. Like the rails of FIG. 2, increased width is required within the interchange section to provide a superimposed relationship or rails with respect to the top surface of vehicle motors 76 and 78 during the arc of travel from the primary to secondary guideway.

FIG. 7 is a block diagram of the complete propulsion and suspension electrical system. This electrical system comprises a motor 12, 14, 76 or 78, sensor elements 106 and 108 and the electronic feedback and control circuit 110, 111 respectively. A complete and detailed discussion of the specific components of a circuit that may be used in this invention can be found in issued U.S. Pat. No. 3,726,880. It should be noted that various other feedback circuitry means may be employed that accomplish the same overall control as the one of the referenced U.S. patent. A summary thereof is presented.

One sensor 106 is an inertial accelerometer, giving an output signal voltage for an acceleration in the vertical direction as the motor 12, 14, 76 or 78 moves vertically up or down in space with regard to a fixed point in free space. The output thereof passes through compensating network 112 to alter the frequency versus amplitude response.

Another sensor 108 is a position transducer. This gives length of vertical gap information. It may employ mechanical contact, or optical, sonic means, electrical or pneumatic, to accomplish the measurement. The vertical gap length $l$, usually within the range of from substantially zero to one inch, could however be greater depending on various requirements. A second compensating network 114 provides an adjustable voltage reference for the gap measurement and provides amplification and differentiation to provide a velocity signal output. Thereafter, the position signal is algebraically summed with the acceleration signal and amplified.

The attractive force between motor 12, 14, 76 or 78 and rail 42, 44, 80 or 82 is proportional to the square of the current passing through the coils of the motor. To provide feedback loop stability, this second order function must be linearized by square root circuit 116 having an electrical output equivalent to the square root of its electrical input.

Multipliers 118, 120 and 122 provide an output voltage equal to the product of its input voltages. The output of the square root circuit 116 is multiplied with one of the phase signal voltage outputs 124, 126 or 128 from oscillator 130 of the three-phase constant voltage variable frequency type.

Likewise, multipliers 132, 134 and 136 multiply the outputs of their associated multipliers 118, 120 and 122 respectively and the signal voltage from position transducer 108. This output voltage of each of the multipliers 132, 134 and 136 is summed with a parallel differential signal from their associated differentiator 138, 140 and 142 respectively. This summed output voltage supplies a control signal to the input controllable amplifiers 144, 146 and 148 so as to provide a varying flux level and frequency at motor 12, 14, 76 or 78.

Speed and direction controller 150 provides direction control and frequency control of the oscillator 130. System power is supplied from external source 152, which could be any convenient power source such as a power house or vehicle borne dynamo.

For simplification, in the following explanation, it will be presumed that the vertical gap spacing $l$ between motor 12, 14, 76 or 78 and rail 42, 44, 80 or 82, of FIG. 5, remains constant throughout the vehicle guidance control. With a constant gap length, the square rooter 116 output remains constant as does the output from the position transducer 100 and accelerometer sensor 106.

Main power to the vehicle electrical circuits is applied by connecting any convenient source 152. Oscillator 130 has three fixed outputs that are identical in amplitude and have an angular phase relationship equal to the instantaneous voltage level of an equivalent three-phase ac system. These voltages passing through the circuitry of the control circuit provides $\phi A$, $\phi B$, and $\phi C$ voltage to suspend the motor 12, 14, 76 or 78 from rail 42, 44, 80 or 82 at a preselected distance $l$.

The speed control 150 is positioned by the operator so that its output dc voltage is at the correct polarity representing the direction of travel desired and is at a level that corresponds to the forward vehicle speed required. This dc voltage level is then converted to corresponding frequency outputs from the oscillator 130 having a constant voltage level.

Each of the two vehicle motors of FIGS. 1, 3, 4, and 6 has a control system as shown in FIG. 7 or its equivalent, therefore, for straightaway travel, the three phase outputs from each oscillator are at the same frequency and amplitude level so as to provide the same forward speed for each vehicle motor. It should be noted that the suspension forces of the system of FIG. 7 depend directly on the magnitude of the voltage input $\phi A$, $\phi B$, and $\phi C$ of the motor while the forward speed depends on frequency of this same input voltage. Both motors, for straightaway travel, require the same input voltage level and frequency.

When switching is desired from a primary guideway to a secondary guideway, such as that shown by FIGS. 2, 3, 4 and 6, the motor input voltage level must remain constant while the motor input frequencies are varied so that the motor on the inside of the desired transition arc travels at a slower speed than the motor on the outside of the arc. This frequency difference is established by merely changing the frequency output of either or both of the oscillators by operator selection or by a vehicle on board computer and associated switch sensors not shown. The frequency difference calculations must take into consideration both the existing forward speed of the vehicle and the variable or constant radius of the arc of curvature through the guideway transition.

As the vehicle passes through the arcuate intersection of the primary and secondary guideway, the vehicle structure, namely, the support member 24 or the motor support member 84, depending on the vehicle embodiment, passes through the openings in the rails as hereinbefore discussed without physical contact therewith.

The invention may be embodied in other specific forms without departing from the spirit or essential characteristics thereof. The present embodiments are therefore to be considered in all aspects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patents is:

1. Apparatus for the switching of a magnetically suspended, guided and propelled vehicle from a first to a second guideway of travel through an arcuate intersection comprising:
    an electro-magnetic force field motor having associated variable energizing voltage means positioned on said vehicle for magnetically suspending and propelling said vehicle;
    each of said guideways and said arcuate intersection comprise a pair of spaced apart ferro-magnetic rails positioned so as to provide a superimposed spaced relationship with the entire opposing surface of said electro-magnetic force field motors as the vehicle passes along any of the guideways or the intersection of said rails; and
    control means for varying the energizing voltage carried by said vehicle for separately controlling the motor-rail spacing and forward speed of said electro-magnetic force field motors with respect to said rails so as to provide like vertical gap spacing therefrom while said electro-magnetic force field motors operate independently through a range of linear speeds.

2. The invention as defined in claim 1 wherein said electro-magnetic force field motors are plural phase electro-magnets.

3. The invention as defined by claim 2 wherein said plural phase comprises three phases.

4. The invention as defined in claim 1 wherein said energizing voltage means comprises a controllable plural phase power amplifier source of variable amplitude and variable frequency voltage for respectively energizing said plural phase electro-magnets.

5. The invention as defined in claim 1 wherein said rails have increased width in the area of said arcuate intersection.

6. The invention as defined in claim 1 wherein said rails are solid ferro-magnetic material.

7. The invention as defined in claim 1 wherein said rails are longitudinally laminated ferro-magnetic material.

8. The invention as defined in claim 1 wherein said control means comprises gap length and frequency control means carried by each of said motors for simultaneously regulating the amplitude of each phase of the energizing voltage to restore and maintain the motor in stable equilibrium at a predetermined gap distance and simultaneously regulating the frequency of each phase of said energizing voltage to set the linear speed of the motor along the rail.

9. The invention as defined in claim 1 wherein said control means comprises:
    a position transducer responsive to the length of the motor rail gap and producing a first electrical signal;
    an accelerometer element responsive to motion of the electro-magnetic force field motor associated with any potential change in the gap;
    a feedback circuit associated with said position transducer and elements and producing a second electrical signal;
    a multi-phase variable frequency oscillator for producing separate constant amplitude signals; and
    a speed and direction control circuit means comprising a first multiplier means for producing an output corresponding to the product of each of said constant amplitude signals times said second electrical signal, differentiator means for producing an output corresponding to the differential of the product of said first multiplier means, and second multiplier means for producing an output corresponding to the product of said first multiplier means times said first electrical signal said second multiplier means includes means for summing its output with the output of said differentiator means.

10. The invention as defined in claim 1 wherein at least one safety vehicle support member attached to said vehicle upper surface to support said vehicle when said energizing voltage is removed.

11. The invention as defined in claim 10 wherein, at the upper surface said vehicle safety support member comprises vertical translating means and electrical pick up means.

* * * * *